United States Patent
Wu et al.

(10) Patent No.: US 12,012,233 B2
(45) Date of Patent: Jun. 18, 2024

(54) ACTIVE ON ORBIT FLUID PROPELLANT MANAGEMENT AND REFUELING SYSTEMS AND METHODS

(71) Applicant: Ball Aerospace & Technologies Corp., Boulder, CO (US)

(72) Inventors: Gordon C. Wu, Lafayette, CO (US); Derek Chan, Boulder, CO (US); Robert J. Baltrum, Jr., Longmont, CO (US); Eric R. Turner, Longmont, CO (US)

(73) Assignee: Ball Aerospace & Technologies Corp., Boulder, CO (US)

(*) Notice: Subject to any disclaimer, the term of this patent is extended or adjusted under 35 U.S.C. 154(b) by 231 days.

(21) Appl. No.: 17/740,111

(22) Filed: May 9, 2022

(65) Prior Publication Data
US 2022/0355954 A1 Nov. 10, 2022

Related U.S. Application Data

(60) Provisional application No. 63/186,571, filed on May 10, 2021.

(51) Int. Cl.
*B64G 1/40* (2006.01)
*F02K 9/58* (2006.01)
(Continued)

(52) U.S. Cl.
CPC ............... *B64G 1/402* (2013.01); *B64G 1/64* (2013.01); *F02K 9/42* (2013.01); *F02K 9/44* (2013.01);
(Continued)

(58) Field of Classification Search
CPC ..... F02K 9/44; F02K 9/46; F02K 9/50; F02K 9/566; B64G 1/402; B64G 5/00
See application file for complete search history.

(56) References Cited

U.S. PATENT DOCUMENTS 3,350,886 A 11/1967 Feraud et al.
4,609,169 A * 9/1986 Schweickert .......... B64G 1/402
60/734

(Continued)

FOREIGN PATENT DOCUMENTS

EP 2530018 7/2014
EP 3689758 3/2021
WO WO-2006056716 A1 * 6/2006 ............. B64G 1/402

OTHER PUBLICATIONS

"Control valves," Wikipedia, Nov. 18, 2009, 2 pages.
(Continued)

*Primary Examiner* — Kyle Robert Thomas
(74) *Attorney, Agent, or Firm* — Sheridan Ross P.C.

(57) ABSTRACT

Chemical propellant storage and supply systems and methods for use on spacecraft are provided. The systems and methods include a fluid pump for moving chemical propellant within the system at selected pressures. This can include operating the fluid pump to supply propellant to a thruster system at a selected pressure. A fuel tank can be refilled by connecting a propellant resupply source to the system, and operating the fluid pump to move propellant from the propellant resupply source to the fuel tank. In a system with multiple fuel tanks, the fluid pump can be operated to move propellant from a donor fuel tank to a recipient fuel tank. The chemical propellant can be stored in one or more fuel tanks at a relatively low pressure. In addition, the chemical propellant is not pressurized by a gaseous pressurant while it is stored in the fuel tank.

19 Claims, 7 Drawing Sheets

(51) Int. Cl.
  *F02K 9/46* (2006.01)
  *F02K 9/44* (2006.01)
  *F02K 9/56* (2006.01)
  *F02K 9/42* (2006.01)
  *F02K 9/50* (2006.01)
  *B64G 1/64* (2006.01)

(52) U.S. Cl.
  CPC ............... *F02K 9/46* (2013.01); *F02K 9/50* (2013.01); *F02K 9/56* (2013.01); *F02K 9/566* (2013.01); *F02K 9/58* (2013.01)

(56) References Cited

U.S. PATENT DOCUMENTS

| | | | |
|---|---|---|---|
| 4,880,185 A | 11/1989 | Apfel | |
| 4,923,152 A * | 5/1990 | Barkats | B64G 1/401 244/171.1 |
| 5,026,259 A | 6/1991 | Whitehead et al. | |
| 5,203,844 A * | 4/1993 | Leonard | B64G 1/002 244/171.3 |
| 5,305,970 A | 4/1994 | Porter et al. | |
| 5,651,515 A | 7/1997 | Saccoccia et al. | |
| 5,823,478 A | 10/1998 | Dunn | |
| 5,927,653 A | 7/1999 | Mueller et al. | |
| 5,961,074 A | 10/1999 | Dunn | |
| 6,119,985 A | 9/2000 | Clapp et al. | |
| 6,299,107 B1 | 10/2001 | Kong et al. | |
| 6,301,876 B1 | 10/2001 | Back et al. | |
| 6,314,978 B1 | 11/2001 | Lanning et al. | |
| 6,457,306 B1 | 10/2002 | Abel et al. | |
| 6,834,493 B2 * | 12/2004 | Hashimoto | F02K 9/46 60/204 |
| 6,971,228 B2 | 12/2005 | Dujarric | |
| 7,762,498 B1 | 7/2010 | Henderson et al. | |
| 8,074,935 B2 | 12/2011 | Gryniewski et al. | |
| 8,181,911 B1 | 5/2012 | Gryniewski et al. | |
| 8,393,582 B1 | 3/2013 | Kutter et al. | |
| 8,899,527 B2 * | 12/2014 | Allen | B64G 1/222 244/172.3 |
| 9,108,747 B2 | 8/2015 | Roberts et al. | |
| 9,145,216 B2 | 9/2015 | Gascon et al. | |
| 9,249,758 B2 | 2/2016 | Conrardy | |
| 9,260,206 B2 | 2/2016 | Allen et al. | |
| 9,334,855 B1 | 5/2016 | Hruby et al. | |
| 9,446,862 B2 | 9/2016 | Barthoulot et al. | |
| 9,567,111 B2 | 2/2017 | Roberts et al. | |
| 9,676,499 B2 | 6/2017 | Myers et al. | |
| 9,688,422 B2 | 6/2017 | Roberts et al. | |
| 10,180,118 B2 | 1/2019 | Berg et al. | |
| 10,589,879 B2 | 3/2020 | Baldwin et al. | |
| 10,604,281 B2 | 3/2020 | Raven et al. | |
| 10,738,739 B2 | 8/2020 | Bahn | |
| 10,844,808 B2 | 11/2020 | Bahn et al. | |
| 10,926,892 B1 | 2/2021 | Wu et al. | |
| 10,926,982 B1 | 2/2021 | Lindberg | |
| 11,021,273 B1 | 6/2021 | Wu et al. | |
| 11,059,608 B2 | 7/2021 | Holder et al. | |
| 11,060,482 B2 * | 7/2021 | Kwak | F02K 9/46 |
| 11,346,306 B1 | 5/2022 | Wu et al. | |
| 2002/0139902 A1 | 10/2002 | Valentian | |
| 2002/0179776 A1 | 12/2002 | Mueller et al. | |
| 2003/0075645 A1 | 4/2003 | Randolph et al. | |
| 2003/0131583 A1 | 7/2003 | Kudija, Jr. et al. | |
| 2003/0173469 A1 | 9/2003 | Kudija, Jr. et al. | |
| 2003/0209005 A1 | 11/2003 | Fenn | |
| 2004/0031885 A1 | 2/2004 | D'Ausilio et al. | |
| 2004/0035982 A1 | 2/2004 | Capozzi et al. | |
| 2004/0061028 A1 | 4/2004 | Salvatore et al. | |
| 2004/0226279 A1 | 11/2004 | Fenn | |
| 2004/0245406 A1 | 12/2004 | Guiheen et al. | |
| 2004/0245407 A1 | 12/2004 | D'Ausilio et al. | |
| 2005/0034447 A1 | 2/2005 | Joshi et al. | |
| 2005/0151022 A1 | 7/2005 | D'Ausilio et al. | |
| 2005/0205717 A1 | 9/2005 | Salvatore et al. | |
| 2007/0040067 A1 | 2/2007 | D'Ausilio et al. | |
| 2007/0108349 A1 | 5/2007 | D'Ausilio et al. | |
| 2007/0114334 A1 | 5/2007 | D'Ausilio et al. | |
| 2007/0153960 A1 | 7/2007 | D'Ausilio et al. | |
| 2007/0153961 A1 | 7/2007 | D'Ausilio et al. | |
| 2007/0153962 A1 | 7/2007 | D'Ausilio et al. | |
| 2008/0011903 A1 | 1/2008 | D'Ausilio et al. | |
| 2008/0027595 A1 | 1/2008 | Fowler et al. | |
| 2008/0029651 A1 | 2/2008 | D'Ausilio et al. | |
| 2008/0142639 A1 | 6/2008 | Jallade | |
| 2008/0256924 A1 | 10/2008 | Pederson et al. | |
| 2008/0265098 A1 | 10/2008 | Connelly et al. | |
| 2008/0296436 A1 | 12/2008 | D'Ausilio et al. | |
| 2009/0020650 A1 | 1/2009 | Ho | |
| 2009/0078829 A1 | 3/2009 | Ho et al. | |
| 2009/0242704 A1 | 10/2009 | D'Ausilio et al. | |
| 2009/0299553 A1 | 12/2009 | Hope | |
| 2009/0313967 A1 | 12/2009 | Joshi et al. | |
| 2009/0320974 A1 | 12/2009 | Joshi et al. | |
| 2010/0180443 A1 | 7/2010 | Joshi et al. | |
| 2011/0144835 A1 | 6/2011 | Ho | |
| 2011/0180670 A1 | 7/2011 | D'Ausilio et al. | |
| 2012/0241355 A1 | 9/2012 | Tuttle et al. | |
| 2012/0241459 A1 | 9/2012 | Tuttle | |
| 2012/0325972 A1 | 12/2012 | Gryniewski et al. | |
| 2013/0313370 A1 | 11/2013 | Rakers | |
| 2014/0032092 A1 | 1/2014 | Vu | |
| 2014/0365043 A1 | 12/2014 | Vu | |
| 2015/0021439 A1 | 1/2015 | Duchemin et al. | |
| 2016/0200457 A1 | 7/2016 | Droppers | |
| 2016/0273524 A1 | 9/2016 | Keidar et al. | |
| 2016/0333826 A1 | 11/2016 | Tsay et al. | |
| 2016/0368624 A1 | 12/2016 | Hruby et al. | |
| 2017/0283095 A1 | 10/2017 | Koehler et al. | |
| 2017/0284339 A1 | 10/2017 | Koehler et al. | |
| 2017/0361951 A1 | 12/2017 | Walker | |
| 2017/0363044 A1 | 12/2017 | Rhodes | |
| 2017/0370353 A1 | 12/2017 | Keidar et al. | |
| 2018/0148197 A1 | 5/2018 | Halsband et al. | |
| 2018/0186476 A1 | 7/2018 | Poncet et al. | |
| 2018/0327118 A1 | 11/2018 | Ganapathy et al. | |
| 2018/0370659 A1 | 12/2018 | Keidar et al. | |
| 2019/0077523 A1 | 3/2019 | Faber | |
| 2019/0144140 A1 | 5/2019 | Hosoda et al. | |
| 2019/0168606 A1 | 6/2019 | Faber et al. | |
| 2020/0003159 A1 | 1/2020 | Karp et al. | |
| 2020/0024003 A1 | 1/2020 | Koehler et al. | |
| 2020/0283174 A1 | 9/2020 | Kokorich et al. | |
| 2020/0377237 A1 * | 12/2020 | Hanson | B64G 1/402 |
| 2020/0407084 A1 | 12/2020 | Shashurin et al. | |

OTHER PUBLICATIONS

Chato "Technologies for Refueling Spacecraft On-Orbit," NASA, Nov. 2000, NASA/TM-2000-210476, 14 pages.

Devereaux et al. "Development Testing of a New Bipropellant Propulsion System for the GMP-T Spacecraft," 46th AIAA/ASME/SAE/ASEE Joint Propulsion Conference & Exhibit, Jul. 25-28, 2010, AIAA 2010-6649, 13 pages.

Gorin "Next Generation Fill and Drain/Vent Valve," 41st AIAA/ASME/SAE/ASEE Joint Propulsion Conference & Exhibit, Jul. 10-13, 2005, AIAA 2005-3731, 5 pages.

* cited by examiner

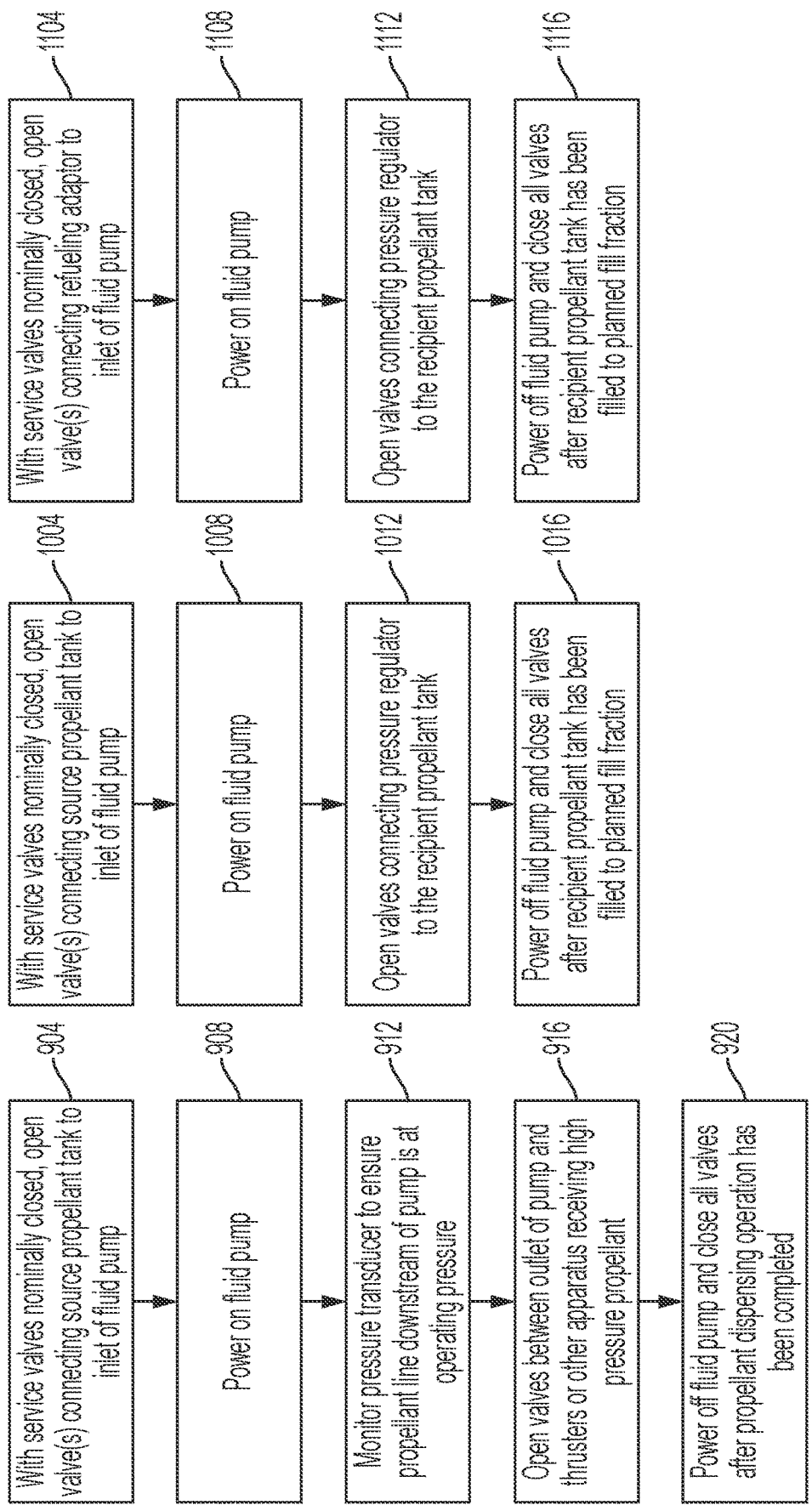

ACTIVE ON ORBIT FLUID PROPELLANT MANAGEMENT AND REFUELING SYSTEMS AND METHODS

CROSS-REFERENCE TO RELATED APPLICATIONS

This application claims the benefit of U.S. Provisional Patent Application Ser. No. 63/186,571, filed May 10, 2021, the entire disclosure of which is hereby incorporated herein by reference.

FIELD

Systems and methods for managing and refueling chemical propellant systems on spacecraft are provided.

BACKGROUND

Spacecraft and satellites (hereinafter referred to collectively as spacecraft) often incorporate thrusters for propulsion and attitude control. Thrusters can include bi-propellant propulsion systems that operate by combusting a chemical propellant in a combustion chamber or mono-propellant systems that operate by decomposing a propellant in a chamber to produce an exhaust gas that is ejected through a nozzle, thereby creating thrust in a desired direction. Liquid propellants are typically dispensed using a pressurized gas, such as helium or nitrogen, as a pressurant.

An ability to refuel spacecraft while in orbit or while otherwise operational is desirable in order to prolong the useful life of the spacecraft. One approach is to force propellant into the spacecraft against the pressure supplied by the pressurant. However, this takes significant time, is difficult, and requires relatively complex servicer spacecraft designs. Alternatively, pressure in the system can be reduced by venting the pressurant. However, this results in loss of the pressurant, and thus requires reloading of the pressurant in addition to the propellant.

SUMMARY

Embodiments of the present disclosure provide for chemical propellant storage and supply systems and methods. The systems and methods include a fluid pump for moving chemical propellant within the system components at selected pressures. The chemical propellant can be held in a fuel or storage tank as a liquid, without the addition of a gaseous pressurant. A fill/drain conduit, and refueling conduit, and associated valves can be included to facilitate refueling operations. During refueling, the fluid pump can be operated to receive propellant from a supply, and to pass that propellant to the fuel tank. Multiple fuel tanks can be included, in which case the fluid pump can be operated to move chemical propellant between different fuel tanks. Embodiments of the present disclosure can further include multiple fluid pumps in a parallel configuration, to provide redundancy.

Systems in accordance with embodiments of the present disclosure include a fuel tank for storing a propellant, a propellant supply valve in communication with the fuel tank, a fluid pump in selective communication with the fuel tank via the propellant supply valve, a propellant valve, and a thruster system in selective communication with the fluid pump via the propellant valve. In addition, embodiments of the present disclosure include a fill/drain conduit connected to a propellant supply conduit section extending between the propellant supply valve and the fluid pump at a first tee. The system also includes a refueling adapter that can be placed in communication with the fill/drain conduit via a fill/drain valve. In addition, a refueling conduit extends from a second tee, located in a section of the propellant supply conduit between the fluid pump and the thruster system, to a third tee located in a section of the propellant supply conduit between the fuel tank and the fluid pump. A refueling valve is located along the refueling conduit, between the second and third tees.

Methods in accordance with embodiments of the present disclosure include providing a thruster system in which a chemical propellant or fuel is stored in a fuel tank as a liquid, and operating a fluid pump to provide fuel from the fuel tank to a thruster system at a selected pressure. Methods in accordance with embodiments of the present disclosure further include refueling the fuel tank and by connecting a propellant resupply source to a fill/drain conduit that is in turn connected to a refueling adaptor, and passing fuel to the fuel tank via a section of a propellant supply conduit between a propellant supply valve and the fluid pump by operating the fluid pump. Methods in accordance with still other embodiments of the present disclosure provide for operating a fluid pump to transfer fuel stored in a first fuel tank of a thruster system to a second fuel tank of the thruster system.

Additional features and advantages of embodiments of the disclosed systems and methods will become more readily apparent from the following description, particularly when taken together with the accompanying drawings.

BRIEF DESCRIPTION OF THE DRAWINGS

FIG. 9 is a flowchart depicting aspects of a process for dispensing a chemical propellant in a thruster system in accordance with embodiments of the present disclosure;

FIG. 10 is a flowchart depicting aspects of a process for rebalancing a chemical propellant between multiple fuel tanks in a thruster system in accordance with embodiments of the present disclosure; and FIG. 11 is a flowchart depicting aspects of a process for refueling a chemical propellant of a thruster system in accordance with embodiments of the present disclosure.

DETAILED DESCRIPTION

Figures 1, 2:
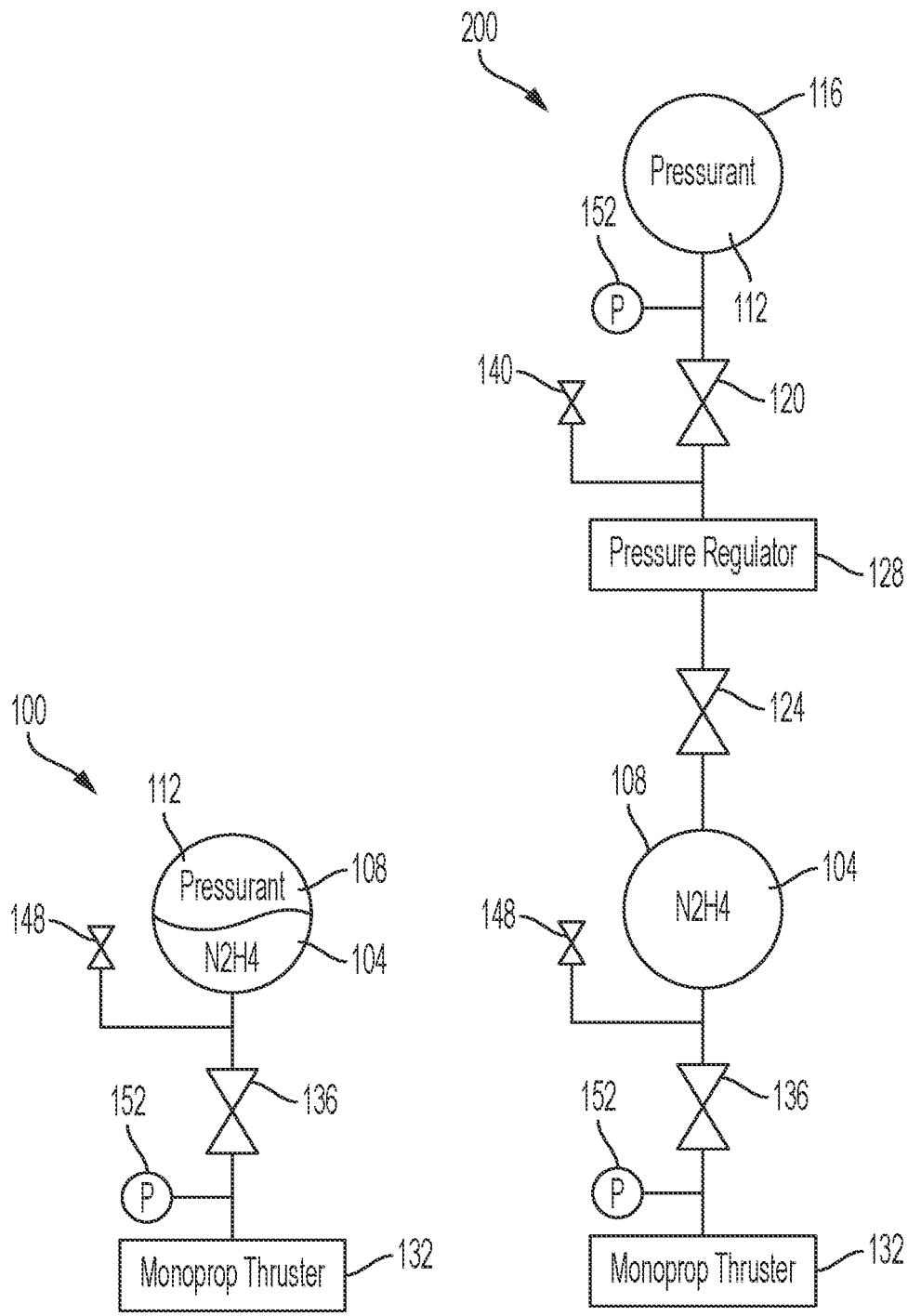
FIG. 1 is a block diagram depicting a conventional blowdown monopropellant thruster system.
FIG. 2 is a block diagram depicting a conventional pressure regulated monopropellant thruster system.

An example of a prior art chemical propellant thruster system 100, and in particular a blowdown monopropellant type thruster system, is illustrated in FIG. 1. In this example system 100, the chemical propellant 104 is hydrazine ($N_2H_4$) contained within a fuel tank 108. The chemical propellant 104 is pressurized by a pressurant 112. The chemical propellant 104 is selectively passed to a propellant thruster 132 via a propellant valve 136. A propellant fill/drain valve 148 and a pressure transducer 152 can also be included in the system 100. By selectively operating the various valves 136 and 148, and in particular by closing the propellant valve 136 and opening the fill/drain valve 148 while a propellant resupply source is connected to the fill/drain valve 148, refueling by adding propellant 104 to the fuel tank 108 against the pressure introduced by the pressurant 112 can be accomplished. However, forcing propellant 104 into the system 100 against the pressure of the pressurant 112 is difficult. In particular, refueling requires pushing against the pressure head of the pressurant 112 at a significant pressure, particular as the fuel tank 108 nears a full state. For example, when full, the pressure within the fuel tank 108 can be about 400 psi or more.

An example of another prior art chemical propellant thruster system 200, and in particular a pressure regulated monopropellant type thruster system, is illustrated in FIG. 2. In this example system 200, the chemical propellant 104 is again hydrazine ($N_2H_4$) contained within a fuel tank 108. The chemical propellant 104 is pressurized by a pressurant 112, which is stored in a pressurant tank or chamber 116 connected to the fuel tank 108 via a pressurant tank valve 120, a pressure regulator 128, and a pressurant supply valve 124. The chemical propellant 104 is selectively passed to a propellant thruster 132 via a propellant valve 136. A pressurant tank fill/drain valve 140, a propellant fill/drain valve 148, and various pressure transducers 152 can also be included in the system 200. By selectively operating the various valves, refueling by adding propellant 104 to the fuel tank 108 can be accomplished. For instance, by closing the propellant valve 136 and opening the fill/drain valve 148 while a propellant resupply source is connected to the fill/drain valve 148, the propellant 104 can be added by forcing it into the fuel tank 108 against the pressure introduced by the pressurant 112. However, even if one or both of the valves 120 and 124 between the pressurant tank 116 and the fuel tank 108 is closed, forcing propellant 104 into the system 100 against the pressure of the pressurant 112 is difficult or impossible, for example where the pressure head of the pressurant 112 is greater than the rated maximum pressure of the fuel tank 108.

Alternatively, by closing the pressurant valve 136 and the pressurant tank valve 120, opening the pressurant supply valve 124 and the pressurant tank fill/drain valve 140, it is possible to vent pressurant 112 acting on the fuel tank 108, thereby removing or reducing the pressure head from the fuel tank 108. Propellant 104 can then be added to the fuel tank 108 at the reduced pressure through the propellant fill/drain valve 148 while a resupply source is connected to the system at the propellant fill/drain valve 148. Accordingly, venting the pressurant 112 can vastly reduce the pressure required to refill the fuel tank 108 with propellant 104. However, venting pressurant 112 is wasteful, and can result in a need to refill the pressurant tank 116.

Figure 3:
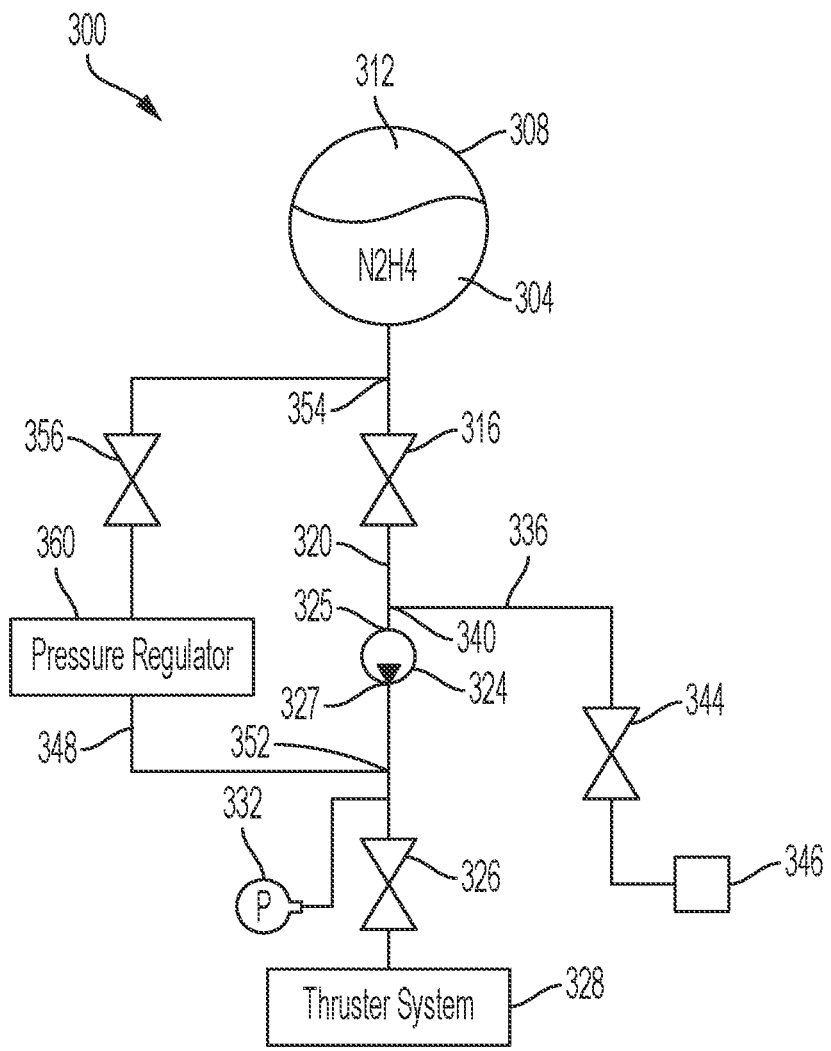
FIG. 3 is a block diagram depicting a chemical propellant thruster system in accordance with embodiments of the present disclosure.

With reference now to FIG. 3, a chemical propellant thruster or propulsion system 300 in accordance with embodiments of the present disclosure is depicted. In this example a chemical propellant 304, such as but not limited to hydrazine, is contained within a fuel tank 308. As can be appreciated by one of skill in the art after consideration of the present disclosure, the chemical propellant 304 can be maintained in the fuel tank 308 as a liquid. Moreover, the headspace 312 within the fuel tank 308 can be occupied by a vapor. For example, the headspace 312 in a system in accordance with embodiments of the present disclosure can be at least partially occupied by a vapor that includes the chemical propellant 304, and/or an inert gas. A propellant supply valve 316 can be located along a propellant supply conduit 320 that is in communication with a storage volume of the fuel tank 308. A fluid pump 324, having an inlet 325 and an outlet 327, is located between the propellant supply valve 316 and a thruster system 328. Accordingly, with the propellant supply valve 316 in an open state, the storage volume of the fuel tank 308 is placed in communication with an inlet of the fluid pump. A pressure transducer 332 can be located between the fluid pump 324 and the thruster system 328. In addition, a thruster valve 326 can be provided between the fluid pump 324 and the thruster system 328. With the thruster valve 326 in an open state, the thruster system 328 is in placed in communication with the outlet of the fluid pump 324. Accordingly, in this system 300, the fluid pump 324 can be operated to supply propellent 304 from the fuel tank 308 to the thruster system 328 at the required pressure when the thruster 328 is in operation. In particular, a required pressure, as sensed by the pressure transducer 332, can be maintained through operation of the fluid pump 324. Moreover, the system does not require the inclusion of a pressurant gas in the fuel tank 308 to pressurize the fuel 304 held in the fuel tank 308, and the propellant 304 can be stored in the fuel tank 308 at relatively low pressures (e.g. from 2-15 psi).

In addition, the system 300 in accordance with embodiments of the present disclosure can include a fill/drain conduit 336 that extends between a first tee 340 located between the propellant supply valve 316 and the inlet side of the fluid pump 324, and a fill/drain valve 344. The fill/drain valve 344 can include or can be associated with a refueling adaptor or fitting 346, such as but not limited to an on-orbit serviceable quick-connect adapter. A refueling conduit 348 can extend from a second tee 352 located between the outlet side of the fluid pump 324 and the thruster system 328, and more particularly between the outlet side of the fluid pump 324 and the thruster valve 326, to a third tee 354 between the fuel tank 304 and the propellant supply valve 316. A refueling valve 356 is located along the refueling conduit 348. A pressure regulator 360 can also be included at some point along the refueling conduit 348, for example between the second tee 352 and the refueling valve 356. Thus configured, the system 300 can be refueled by connecting a propellant resupply source, for example provided as part of a resupply tanker, to the system 300 at the refueling adaptor 346, closing the propellant supply valve 316, closing the thruster valve 326 opening the fill/drain valve 344, and opening the refueling valve 356. Moreover, the fluid pump 324 can be operated during a refueling operation to pump propellant 304 received at the refueling adapter 346 into the fuel tank 308. In accordance with embodiments of the present disclosure, the propellant source can supply propellant 304 within a range of pressures (e.g. from 2-400 psi).

The fluid pump 324 can be operated to control the pressure of the propellant 304 in the refueling conduit 348 (e.g. within a range of 30-400 psi). The pressure regulator 360 can then reduce the pressure of the propellant 304 (e.g. to within a range of 2-15 psi), which then passes through the open refueling valve 356 and into the fuel tank 308.

Figure 4:
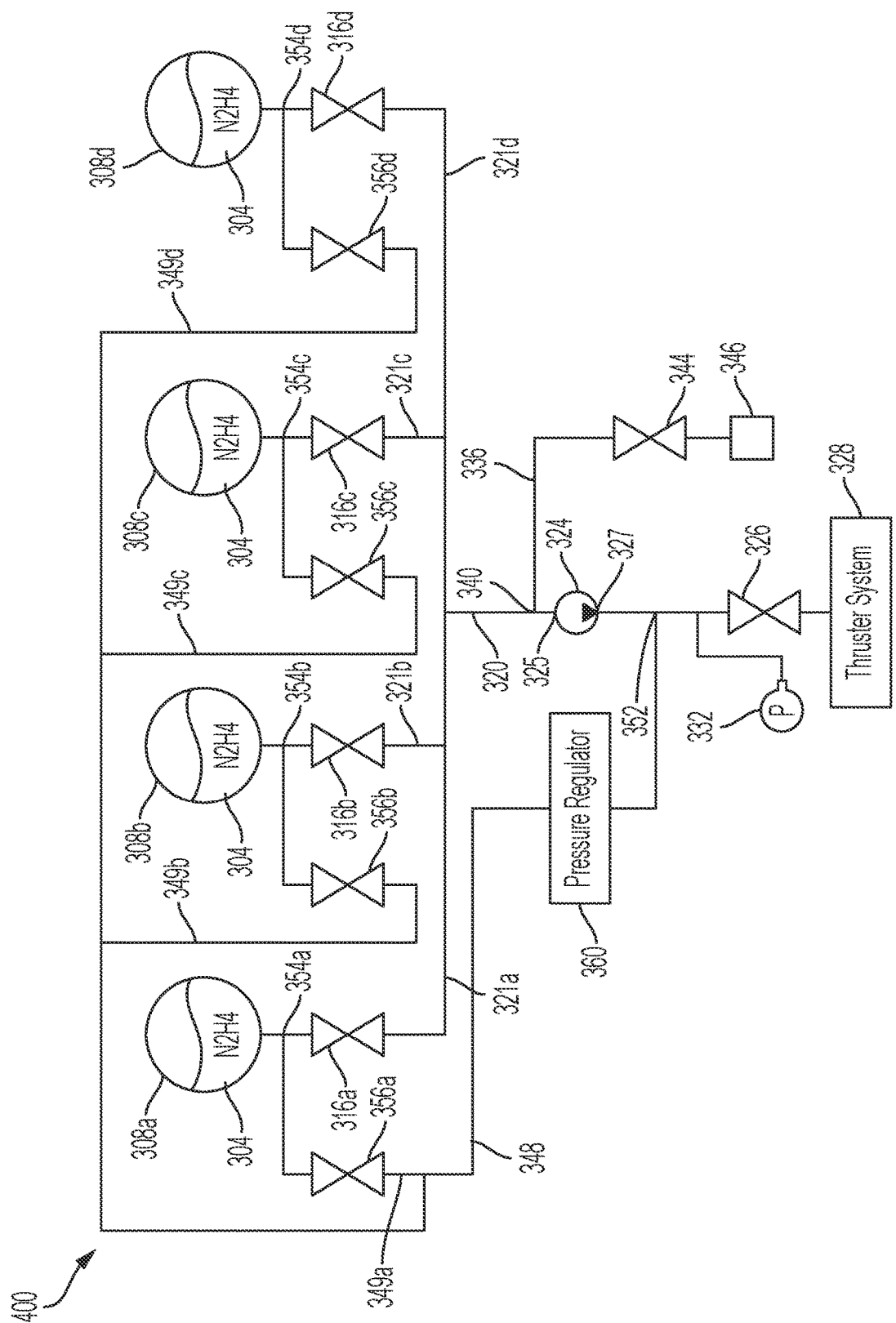
FIG. 4 is a block diagram depicting a chemical propellant thruster system in accordance with other embodiments of the present disclosure.

FIG. 4 depicts a system 400 in accordance with further embodiments of the present disclosure. In this example, the system 400 includes a plurality of fuel tanks 308a-308d, with each fuel tank 308 associated with a corresponding propellant supply valve 316a-316d and a corresponding refueling valve 356a-356d. Here five fuel tanks 308 are shown, but it should be appreciated that any number of fuel tanks 308 can be provided. The inclusion of multiple fuel tanks 308, in combination with the fluid pump 324, enables the center of gravity of a vehicle carrying the system 400 to be shifted by selectively moving fuel 304 between different fuel tanks 308. This can be used to minimize angular momentum by aligning the center of gravity with the center of pressure, or to minimize disturbance torque by aligning the center of gravity with a thrust vector during delta-v maneuvers. In the illustrated system 400, rebalancing propellant 304 can be performed by opening the propellant supply valve 316 of the supplying or donor fuel tank 308, opening the refueling valve 356 of the receiving fuel tank 308, closing the thruster valve 326, and operating the fluid pump 324 to transfer the desired amount of propellant 304 from the donor fuel tank 308 to the receiving fuel tank 308 through the refueling conduit 348. Accordingly, the refueling conduit 348 in such an embodiment can be implemented as a manifold type structure having a set of refueling conduit branches 349a-349d that connect the refueling conduit 348 to each of the fuel tanks 308 through the respective refueling valves 356. Transfers from and/or to multiple fuel tanks 308 can be performed by selectively operating the propellant supply 316 and refueling valves 356. In addition, the propellant supply conduit 320 has a manifold type structure with a set of propellant supply conduit branches 321a-321d that lead from the respective fuel tank to the propellant supply conduit 320. The system 400 thus allows propellant 304 to be selectively drawn from one or multiple fuel tanks 308 during operation of the thruster system 328 by opening a propellant supply valve or valves 316 and thereby placing a selected fuel tank or set of fuel tanks 308 in communication with the inlet 325 of the fluid pump 324.

The system 400 in FIG. 4, like the system 300 in FIG. 3, allows propellant 304 to be transferred from a resupply source connected to the refueling adapter 346 to a receiving fuel tank 308 by operation of the fluid pump 324. In particular, by connecting a propellant resupply source to the refueling adaptor 346, closing the thruster valve 326, opening the fill/drain valve 344 to place the resupply source in communication with the inlet 325 of the fluid pump 324, opening a selected refueling valve 356 to place an associated fuel tank 308 in communication with the outlet 327 of the fluid pump, and operating the fluid pump 324, propellant can be transferred from the resupply source to the selected fuel tank 308. In addition, multiple fuel tanks 308 can be resupplied simultaneously.

Figure 5:
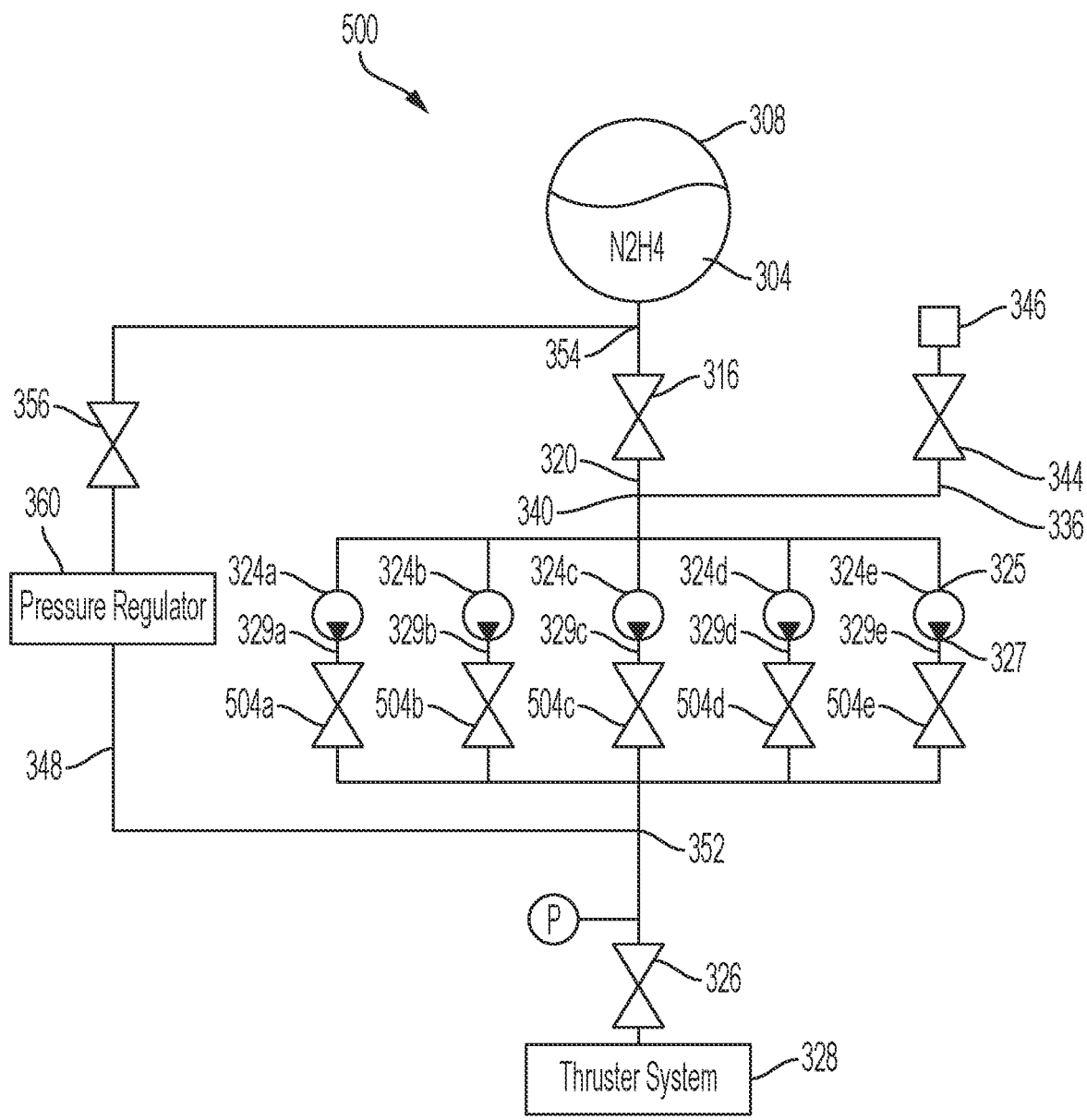
FIG. 5 is a block diagram depicting a chemical propellant thruster system in accordance with other embodiments of the present disclosure.

FIG. 5 depicts a system 500 in accordance with further embodiments of the present disclosure. In this example, the system 500 includes a plurality of fluid pumps 324. Here, five fluid pumps 324a-324e are illustrated, although any number of fluid pumps 324 can be included. The multiple fluid pumps 324 are arranged in parallel, along individual fluid pump conduit branches 329a-329e between the propellant supply valve 316 and the thruster system 328. In addition, each fluid pump 324 can be associated with a fluid pump outlet valve 504a-e disposed between the outlet 327 and the thruster system 328 that can be closed while an associated fluid pump 324 is not in use. Alternatively or in addition, a fluid pump inlet valve (not shown) can be provided for each fluid pump 324, between the inlet 325 of the associated fluid pump 324 and the propellant supply valve 316. The inclusion of multiple fluid pumps 324 allows for redundancy in case of failure of a fluid pump 324. As illustrated, a single fill/drain valve 344 and associated refueling adapter 346 can be connected to a fill/drain conduit 336 that is joined to the propellant supply conduit 320 at a first tee 340. In such an embodiment, any one or more of the fluid pumps 324 can be operated to supply propellant 304 to the thruster system 328 at a selected pressure, or to pump propellant 304 from a resupply source connected to the refueling adapter 346 into the fuel tank 308.

As can be appreciated by one of skill in the art after consideration of the present disclosure, features of the systems shown and described herein can be combined with one another. For example, a system with a multiple fuel tanks 308 can also include multiple fluid pumps 324. For instance, each fuel tank 308 can be associated with its own fluid pump 324 and fluid pump outlet valve 504 located along a corresponding supply conduit branch 321. Alternatively, a greater number of fuel tanks 308 than fluid pumps 324 can be included, and a set of more than one fuel tank 308 can be associated with a shared fluid pump 324. In addition, although monopropellant systems have been illustrated, it should be appreciated that embodiments of the present disclosure can be applied to bipropellant systems, and/or multiple fuel systems. Embodiments of the present disclosure can be operated in response to control signals provided by an on-board control system operating autonomously, operating partially autonomously, or operating in response to instructions received from a remotely located operating system or human operator, or from an on-board human operator.

Figure 6:
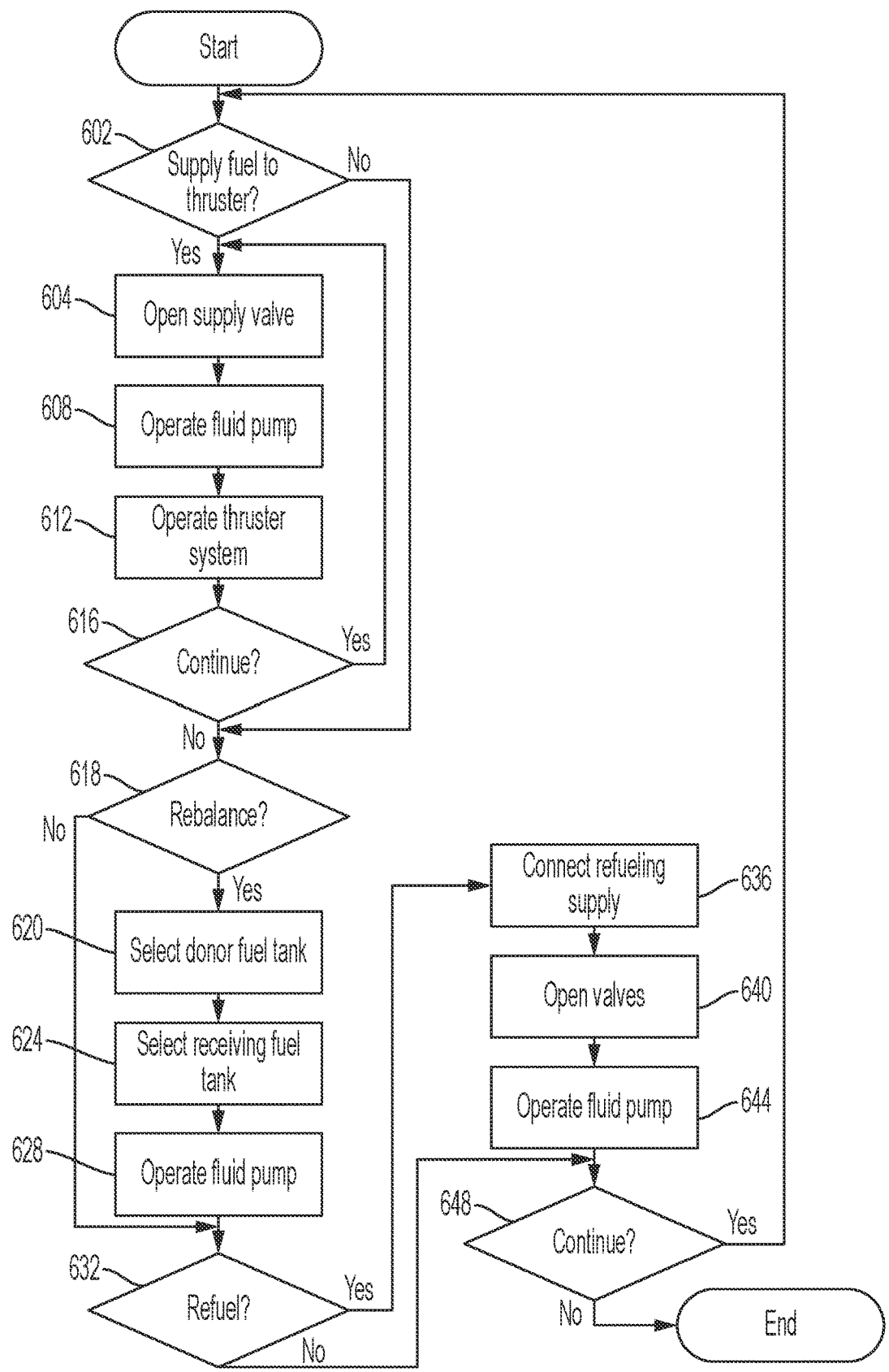
FIG. 6 is a flowchart depicting aspects of a process for operating and refueling a chemical propellant thruster system in accordance with embodiments of the present disclosure.

FIG. 6 is a flowchart depicting aspects of a process for operating and refueling a chemical propellant thruster system in accordance with embodiments of the present disclosure. Initially, a determination is made as to whether the system is to be operated to supply fuel 304 to a thruster 328 (step 602). If fuel 304 is to be supplied, a supply valve 316 associated with a selected fuel tank 308 is opened, placing the interior volume of the fuel tank 308 in communication with the inlet 325 to a fluid pump 324 (step 604). In a system including multiple fuel tanks 308, the selection of the fuel tank 308 from which fuel 304 is drawn can take into consideration the amount of fuel 304 contained within the different tanks, or the current or desired location of the center of gravity of the system. In addition, in a system with multiple fuel tanks 308, more than one fuel tank 308 can be selected to supply fuel 304 at the same time. With the supply valve 316 open, the fluid pump 324 is operated to supply fuel 304 to the thruster system 328 (step 608). Where the system includes multiple fluid pumps 324, the fluid pump 324 that is operated can be selected based on various considerations, such as whether the operating parameters of a particular fluid pump 324 are within nominal limits. The propellant valve 326 is then opened, placing the outlet 327 of the fuel pump 324 in communication with the thruster system 328, and the thruster system 328 is operated to provide a selected thrust vector (step 612). At step 616, a determination can be made as to whether thrust should continue to be provided. If yes, the process can return to step 604, and the supply valve 316 for the previously selected fuel tank 308 can be maintained in an open state. In a system having multiple fuel tanks, the previously selected fuel tank 308 can be maintained in an open state, or a supply valve for a different fuel tank 308 can be opened, and the supply tank for a previously opened fuel tank 308 can be closed. Similarly, the fluid pump 324 can continue to be operated or, in a system having multiple fluid pumps 324, a new fluid pump 324 can be selected.

In an embodiment of a system as disclosed herein incorporating multiple fuel tanks 308, after a determination at step 602 that thrust is not to be supplied, or after a determination step 616 that thrust is no longer to be supplied, a determination can be made as to whether to perform a rebalancing operation (step 618). Rebalancing can be performed to counter a shift in the center of gravity of a vehicle, for example as a result of the consumption of propellant 304, or to minimize disturbance torque during a planned application of a particular thrust vector. If rebalancing is to be performed, a donor fuel tank 308 is selected, and the supply valve 316 associated with the donor fuel tank 308 is opened, placing the interior volume of the donor fuel tank 308 in communication with the inlet 325 of the fluid pump 324 (step 620). The receiving fuel tank 308 is selected, and the refueling valve 356 associated with that selected fuel tank 308 is opened, placing the interior volume of the receiving fuel tank 308 in communication with the outlet 327 of the fluid pump 324 (step 624). In addition, the thruster valve 326 is closed. The fluid pump 324 is then operated to transfer a desired amount of fuel 304 from the donor fuel tank 308 to the receiving fuel tank 308 (step 628). Where the system includes multiple fluid pumps 324, a fluid pump 324 can be selected for use based on various considerations.

After a determination at step 618 that a rebalancing operation is not to be performed, or after completing a rebalancing operation, a determination can be made as to whether to perform a refueling operation (step 632). If refueling is indicated, a refueling supply source is connected to the refueling fitting 346 (step 636). The fill/drain valve 344 is then opened, placing the refueling supply source attached to the refueling adaptor 346 in communication with the inlet 325 of the fluid pump 324, and the refueling valve 356 for the receiving fuel tank 308 is opened, placing the outlet 327 of the fluid pump in communication with the receiving fuel tank 308 (step 640). Then, with the thruster valve 326 closed, and the fluid pump 324 is operated to transfer propellant 304 from the refueling supply to the fuel tank 308 (step 644).

At step 648, a determination can be made as to whether operation of the system is to continue. If operation is to continue, the process can return to step 602. Alternatively, the process can end.

Figure 7:
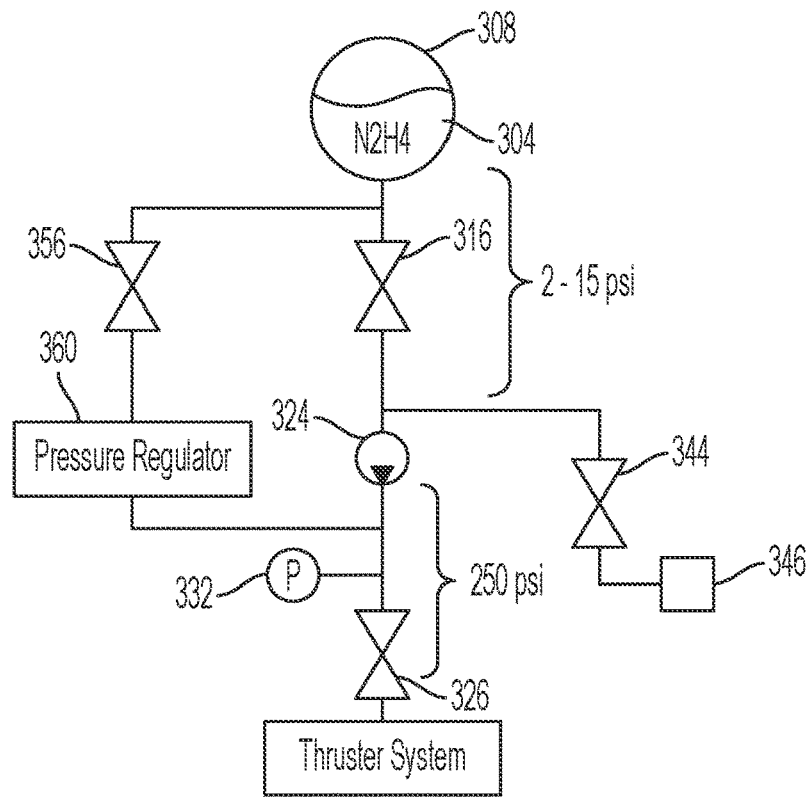
FIG. 7 is an annotated block diagram depicting pressures within various sections of a thruster system in accordance with embodiments of the present disclosure during a fuel dispensing operation.
Figure 8:
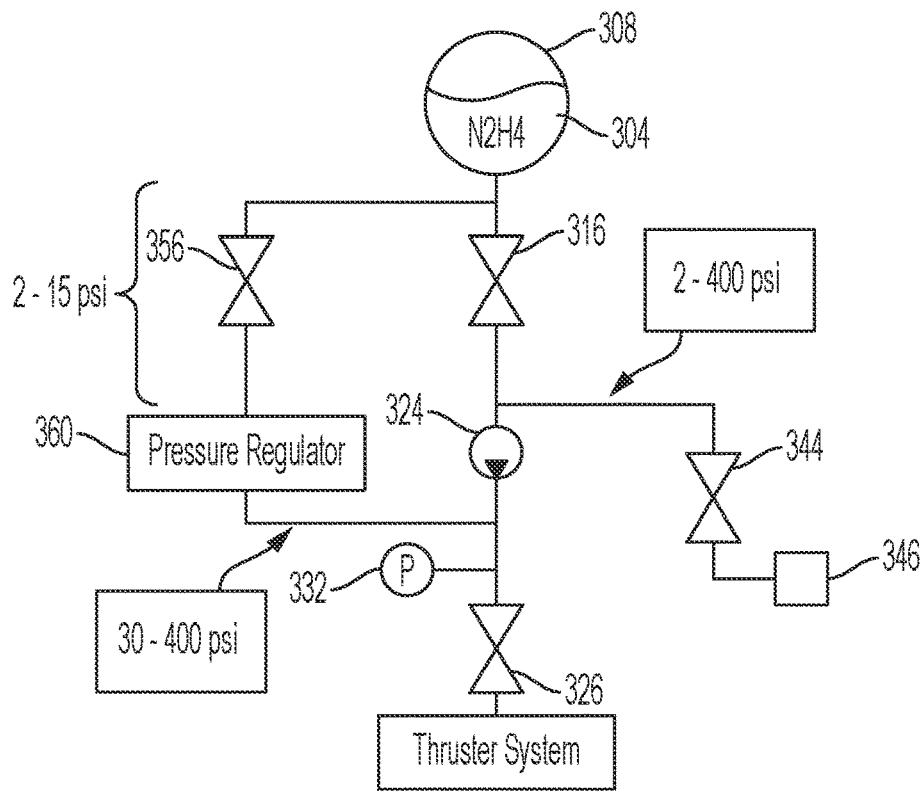
FIG. 8 is an annotated block diagram depicting pressures within various sections of a thruster system in accordance with embodiments of the present disclosure during a refueling operation.

FIG. 7 is an annotated block diagram depicting example chemical propellant pressures within various sections of a chemical propellant thruster system in accordance with embodiments of the present disclosure during a fuel dispensing operation. FIG. 8 is an annotated block diagram depicting example chemical propellant pressures within various sections of a chemical propellant thruster system in accordance with embodiments of the present disclosure during a refueling operation. As shown, embodiments of the present disclosure allow propellant 304 stored in a fuel tank 308 at a relatively low pressure (e.g. from 2 to 15 psi) to be supplied to a thruster system 328 at relatively high pressure (e.g. 250 psi), through the inclusion of a fluid pump 324. Furthermore, it can be appreciated that embodiments of the present disclosure allow for refueling operations to be performed by connecting a source that supplies propellant 304 within a wide range of pressures (e.g. from 2 to 400 psi). That propellant 304 can be transferred to a fuel tank 308 at pressures appropriate to the design characteristics of the system and the fuel tank 308 (e.g. from 2 to 15 psi). Moreover, the fluid pump 324 that is operated to transfer the propellant 304 from the resupply source to the fuel tank 308 can be controlled to supply the propellant 304 using selected pressures (e.g. from 30 to 400 psi) that may differ from the pressure of the propellant as provided by the resupply source, and further that may differ from the pressure at which the propellant 304 is stored in the fuel tank 308 through selective operation of a pressure regulator 360 provided between the fluid pump 324 and the fuel tank 308.

FIG. 9 is a flowchart depicting aspects of a process for dispensing a chemical propellant to a thruster system 328 at high pressure in accordance with embodiments of the present disclosure. Initially, with the various refueling and service valves, such as the fill/drain 344 and refueling 356 valves in a nominally closed condition, the valve or valves connecting the source propellant tank 308 to the fluid pump 324 (e.g. the propellant supply valve 316) are opened (step 904). The fluid pump 324 is then powered on (step 908). An output of the pressure transducer 332 is monitored to ensure that the propellant 304 within the propellant supply conduit 320 downstream of the fluid pump 324 is at the required operating pressure (step 912). With the propellant at the operating pressure, the valve or valves (e.g. the thruster valve 326) between the outlet of the fluid pump 324 and the thruster or thrusters of the thruster system 328, or other apparatus receiving high-pressure propellant 304, are opened (step 916). After the propellant dispensing operation has been completed, the fluid pump 324 is powered off, and all valves opened as part of the propellant dispensing operation are closed (step 920). The dispensing process can then end.

FIG. 10 is a flowchart depicting aspects of a process for rebalancing a chemical propellant 304 between multiple fuel tanks 308 in accordance with embodiments of the present disclosure. Initially, with the various refueling and service valves, such as the fill/drain 344 and refueling 356 valves, in a nominally closed condition, the valve or valves connecting the source propellant tank 308 to the fluid pump 324 (e.g. the propellant supply valve 316) are opened (step 1004). The fluid pump 324 is then powered on (step 1008). The valves connecting the pressure regulator 360 to the recipient propellant tank 308 (e.g. the refueling valve 356 for a selected recipient fuel tank 308) are then opened, allowing propellant 304 to be transferred from the source fuel tank 308 to the recipient fuel tank 308 (step 1012). After the recipient fuel tank 308 has been filled to the planned fill fraction, the fluid pump 324 is powered off, and all valves opened as part of the rebalancing operation are closed (step 1016). The rebalancing process can then end.

FIG. 11 is a flowchart depicting aspects of a process for refueling a chemical propellant thruster system in accordance with embodiments of the present disclosure. Initially, with the various refueling and service valves, such as the fill/drain 344 and refueling 356 valves in a nominally closed condition, a resupply source is connected to the refueling adapter, and the valve or valves connecting the refueling adapter 346 to the fluid pump 324 (e.g. the fill/drain valve 344) are opened (step 1104). The fluid pump 324 is then powered on (step 1108). The valves connecting the pressure regulator 360 to the recipient propellant tank 308 (e.g. the refueling valve 356 four selected recipient fuel tank 308) are then opened, and propellant 304 is transferred from the resupply source to the recipient propellant tank 308 (step 1112). After the recipient fuel tank 308 has been filled to the planned fill fraction, the fluid pump 324 is powered off, and all valves open as part of the refueling operation are closed (step 1116).

As can be appreciated by one of skill in the art after consideration of the present disclosure, the inclusion of a fluid pump 324 in or associated with a propulsion system enables propellant 304 to be stored in a fuel tank 308 at relatively low pressures. This in turn facilitates the reprovisioning or refilling of the fuel tank 308 from a resupply source by removing any need to force fuel 304 into a fuel tank 308 against a pressurant, or to vent pressurant. In addition, the storage of fuel 304 as a liquid and the provision of a fluid pump 324 facilitates the transfer of fuel 304 between different fuel tanks 308. Moreover, by providing various conduits and valves as disclosed herein, the fluid pump 324 need only operate in one direction in performing various fuel supply, fuel resupply, or fuel balancing operations.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A system, comprising:
a fuel tank;
a thruster system;
a propellant supply conduit, wherein the propellant supply conduit extends between the fuel tank and the thruster system;
a propellant supply valve, wherein the propellant supply valve is located along the propellant supply conduit;
a fluid pump, wherein the fluid pump is located along the propellant supply conduit between the propellant supply valve and the thruster system;
a fill/drain conduit, wherein the fill/drain conduit is joined to the propellant supply conduit at a first tee located between the propellant supply valve and the fluid pump;
a refueling conduit, wherein the refueling conduit is joined to the propellant supply conduit at a second tee located between the fluid pump and the thruster system, and wherein the refueling conduit extends to a third tee connected to the propellant supply conduit between the fuel tank and the propellant supply valve; and
a refueling valve, wherein the refueling valve is located along the refueling conduit.

2. The system of claim 1, further comprising:
a refueling adapter; and
a fill/drain valve, wherein the refueling adapter is selectively placed in communication with an end of the fill/drain conduit opposite the first tee by the fill/drain valve.

3. The system of claim 2, further comprising:
a plurality of fuel tanks; and
a plurality of propellant supply valves, wherein each fuel tank in the plurality of fuel tanks can be selectively connected to the thruster system by opening an associated supply valve.

4. The system of claim 3, further comprising:
a plurality of refueling valves, wherein each fuel tank in the plurality of fuel tanks can be selectively connected to the refueling conduit by opening an associated refueling valve.

5. The system of claim 4, further comprising:
a plurality of fluid pumps, wherein each fluid pump is located on one of a plurality of fluid pump conduit branches.

6. The system of claim 5, further comprising:
a plurality of fluid pump outlet valves, wherein each fluid pump in the plurality of fluid pumps is associated with a fluid pump outlet valve.

7. The system of claim 1, further comprising:
a plurality of fluid pumps, wherein each fluid pump is located on one of a plurality of fluid pump conduit branches.

8. The system of claim 7, further comprising:
a plurality of fluid pump outlet valves, wherein each fluid pump in the plurality of fluid pumps is associated with a fluid pump outlet valve.

9. The system of claim 1, wherein the fuel tank contains a liquid propellant is a liquid.

10. The system of claim 9, wherein the propellant is held at a first pressure within the fuel tank, and wherein the fluid pump supplies the propellant to the thruster system at a second pressure that is greater than the first pressure.

11. A method for operating a propellant system, comprising:
storing a propellant in a fuel tank, wherein the propellant is stored in the fuel tank at a first pressure;
placing the fuel tank in communication with an inlet of a fluid pump;
operating the fluid pump to supply propellant from the fuel tank to a thruster system at a second pressure, wherein the second pressure is greater than the first pressure, and wherein the propellant is supplied from the fuel tank to the thruster system by a propellant supply conduit;
connecting a propellant resupply source to the inlet of the fluid pump, wherein the propellant resupply source is connected to a first end of a fill/drain conduit, and wherein a second end of the fill/drain conduit is joined to the propellant supply conduit at a first tee located between the fuel tank and the inlet of the fluid pump;
placing the fuel tank in communication with an outlet of the fluid pump via a refueling conduit, wherein a first end of the refueling conduit is connected to the outlet of the fluid pump, and wherein a second end of the refueling conduit is connected to the fuel tank; and
operating the fluid pump to move propellant from the propellant resupply source to the fuel tank via the refueling conduit.

12. The method of claim 11, wherein the propellant is a chemical propellant stored in the fuel tank at 2-15 psi, and wherein the chemical propellant is supplied by the fluid pump to the thruster system at a pressure of 200-300 psi.

13. The method of claim 11, wherein the propellant is stored in the fuel tank at 2-15 psi, wherein the propellant is supplied by the propellant resupply source at a pressure of 2-400 psi, wherein the propellant received from the propellant resupply source is provided by the fluid pump to the refueling conduit at a pressure of 30-400 psi, and wherein a pressure regulator disposed along the refueling conduit reduces a pressure of the propellant in the refueling conduit to a pressure of 2-15 psi before passing the propellant to the fuel tank.

14. The method of claim 11, wherein the propellant in the fuel tank is not pressurized with a gaseous pressurant.

15. A method for operating a propellant system, comprising:
storing a propellant in each of a plurality of fuel tanks, wherein the propellant is stored in the fuel tanks at a first pressure;
placing at least one of the fuel tanks in communication with an inlet of a fluid pump;
operating the fluid pump to supply propellant from the at least one of the fuel tanks to a thruster system at a second pressure, wherein the second pressure is greater than the first pressure, and wherein the propellant is supplied from the at least one of the fuel tanks to the thruster system by a propellant supply conduit;
stopping operation of the fluid pump;
placing a first fuel tank of the plurality of fuel tanks in communication with an inlet of the fluid pump;
placing a second fuel tank of the plurality of fuel tanks in communication with an outlet of the fluid pump; and
operating the fluid pump to move propellant from the first fuel tank to the second fuel tank, wherein the propellant is moved from the first fuel tank to the second fuel tank using a refueling conduit, wherein a first end of the refueling conduit is connected to the propellant supply conduit at a first tee between outlet of the fluid pump and the thruster system, and wherein a second end of the refueling conduit is connected to the second fuel tank.

16. The method of claim 15, further comprising:
connecting a propellant resupply source to the inlet of the fluid pump;
placing a selected one of the plurality of fuel tanks in communication with an outlet of the fluid pump; and
operating the fluid pump to move propellant from the resupply source to the selected fuel tank.

17. A method for operating a propellant system, comprising:
storing a propellant in each of a plurality of fuel tanks, wherein the propellant is stored in the fuel tanks at a first pressure;
placing at least one of the fuel tanks in communication with an inlet of a fluid pump via a propellant supply conduit;
operating the fluid pump to supply propellant from the at least one of the fuel tanks to a thruster system at a second pressure, wherein the second pressure is greater than the first pressure;
stopping operation of the fluid pump;
connecting a propellant resupply source to the inlet of the fluid pump, wherein the propellant resupply source is connected to a first end of a fill/drain conduit, and wherein a second end of the fill/drain conduit is joined to the propellant supply conduit at a first tee located between the fuel tanks and the inlet of the fluid pump;
placing a selected one of the plurality of fuel tanks in communication with an outlet of the fluid pump, wherein the selected one of the fuel tanks is connected to the outlet of the fluid pump by a refueling conduit; and
operating the fluid pump to move propellant from the propellant resupply source to the selected one of the fuel tanks via the refueling conduit.

18. A method of operating a propulsion system, comprising:
storing a chemical propellant in a first fuel tank;
opening a propellant supply valve to supply propellant from the first fuel tank to a fluid pump;
operating the fluid pump to supply propellant to a thruster system;
after supplying propellant to the thruster system:
stopping operation of the fluid pump;
closing the propellant supply valve, wherein the propellant supply valve is located along a propellant supply conduit between the first fuel tank and the fluid pump;
connecting a fill/drain conduit to a propellant resupply source, wherein the fill/drain conduit extends between the propellant resupply source and a first tee located along the propellant supply conduit, between the propellant supply valve and the fluid pump;
opening a refueling valve located along a refueling conduit that extends between a second tee located along the propellant supply conduit between the fluid pump and the thruster system, and a third tee located along the propellant supply conduit between the first fuel tank and the propellant supply valve; and
operating the fluid pump to move propellant from the propellant resupply source to the first fuel tank.

19. The method of claim 18, further comprising:
storing the chemical propellant in a plurality of fuel tanks, the plurality of fuel tanks including at least the first fuel tank and a second fuel tank;
after supplying propellant to the thruster system and after operating the fluid pump to move propellant from the propellant resupply source to the first fuel tank, opening a propellant supply valve located along a propellant supply conduit between the second fuel tank and the fluid pump; and
operating the fluid pump to move propellant from the second fuel tank to the first fuel tank.

* * * * *